United States Patent
Berajawala et al.

(10) Patent No.: US 10,657,164 B2
(45) Date of Patent: May 19, 2020

(54) DETERMINING ANSWERS TO QUESTIONS USING A HIERARCHY OF QUESTION AND ANSWER PAIRS

(71) Applicant: International Business Machines Corporation, Armonk, NY (US)

(72) Inventors: Suneil H. Berajawala, Lowell, MA (US); Ashok Kumar, North Chelmsford, MA (US); William G. O'Keeffe, Tewksbury, MA (US); David D. Taieb, Charlestown, MA (US)

(73) Assignee: International Business Machines Corporation, Armonk, NY (US)

( * ) Notice: Subject to any disclaimer, the term of this patent is extended or adjusted under 35 U.S.C. 154(b) by 208 days.

(21) Appl. No.: 14/671,300

(22) Filed: Mar. 27, 2015

(65) Prior Publication Data

US 2016/0283581 A1     Sep. 29, 2016

(51) Int. Cl.
  *G06F 17/00* (2006.01)
  *G06F 16/332* (2019.01)
  *G06F 16/338* (2019.01)
  *G06F 16/33* (2019.01)

(52) U.S. Cl.
  CPC ........ *G06F 16/3329* (2019.01); *G06F 16/338* (2019.01); *G06F 16/3344* (2019.01); *G06F 16/3331* (2019.01)

(58) Field of Classification Search
  CPC ................................................ G06F 17/30657
  USPC ........................................................ 707/708
  See application file for complete search history.

(56) References Cited

U.S. PATENT DOCUMENTS

| | | | |
|---|---|---|---|
| 5,442,778 A | 8/1995 | Pedersen et al. | |
| 5,519,608 A | 5/1996 | Kupiec | |
| 6,633,859 B1 | 10/2003 | Farlow | |
| 6,665,841 B1 | 12/2003 | Mahoney et al. | |
| 6,901,394 B2 | 5/2005 | Chauhan et al. | |
| 7,269,545 B2* | 9/2007 | Agichtein | G06F 17/2705 704/1 |
| 7,349,899 B2 | 3/2008 | Namba | |
| 7,844,598 B2 | 11/2010 | Masuichi et al. | |
| 7,873,624 B2* | 1/2011 | Agichtein | G06F 17/30398 707/708 |
| 8,055,675 B2 | 11/2011 | Higgins et al. | |
| 8,145,623 B1 | 3/2012 | Mehta et al. | |

(Continued)

OTHER PUBLICATIONS

Amaral et al., "Priberam's Question Answering System in QA @ CLEF 2007", Sep. 19-21, 2007, 7 pages.

(Continued)

*Primary Examiner* — Eliyah S. Harper
(74) *Attorney, Agent, or Firm* — William H. Hartwell (57) ABSTRACT

Software that answers questions asked of question answering systems, by performing the following steps: (i) identifying a hierarchy of question and answer pairs, where a first answer paired to a first question in the hierarchy of question and answer pairs includes at least a second answer paired to a second question in the hierarchy of question and answer pairs; (ii) receiving, by a question answering system, an input question from a first user; (iii) identifying first user contextual information pertaining to the first user; and (iv) answering the input question, by the question answering system, based, at least in part, on the hierarchy of question and answer pairs and the first user contextual information.

15 Claims, 6 Drawing Sheets

(56) References Cited

U.S. PATENT DOCUMENTS

| | | | |
|---|---|---|---|
| 8,346,701 B2* | 1/2013 | Wang | G06F 17/30634 706/46 |
| 8,463,791 B1 | 6/2013 | Biemer et al. | |
| 8,601,030 B2 | 12/2013 | Bagchi et al. | |
| 8,666,983 B2 | 3/2014 | Brill et al. | |
| 8,682,913 B1 | 3/2014 | Betz | |
| 8,732,204 B2 | 5/2014 | Chua et al. | |
| 8,768,782 B1 | 7/2014 | Myslinski | |
| 8,832,064 B2* | 9/2014 | Stenchikova | G06F 17/279 707/708 |
| 8,838,659 B2 | 9/2014 | Tunstall-Pedoe | |
| 8,886,157 B2* | 11/2014 | Hawkes | H04M 1/72536 455/404.2 |
| 9,213,748 B1* | 12/2015 | Matias | G06F 17/30554 |
| 9,582,757 B1 | 2/2017 | Holmes | |
| 9,703,860 B2 | 7/2017 | Berajawala et al. | |
| 9,727,637 B2* | 8/2017 | Visotski | G06F 17/30719 |
| 9,753,986 B2 | 9/2017 | Dubbels | |
| 9,817,872 B2* | 11/2017 | Pamu | G06F 17/30533 |
| 2002/0029232 A1 | 3/2002 | Bobrow et al. | |
| 2002/0169595 A1* | 11/2002 | Agichtein | G06F 17/2705 704/9 |
| 2002/0194164 A1 | 12/2002 | Morrow et al. | |
| 2003/0101153 A1 | 5/2003 | Francis | |
| 2004/0254917 A1* | 12/2004 | Brill | G06F 17/30654 |
| 2005/0188330 A1* | 8/2005 | Griffin | G06F 3/0237 715/816 |
| 2005/0266387 A1 | 12/2005 | Rossides | |
| 2006/0112036 A1* | 5/2006 | Zhang | G06F 17/30707 706/20 |
| 2007/0094285 A1* | 4/2007 | Agichtein | G06F 17/30398 |
| 2007/0219794 A1 | 9/2007 | Park et al. | |
| 2009/0287678 A1 | 11/2009 | Brown et al. | |
| 2009/0299746 A1 | 12/2009 | Meng et al. | |
| 2009/0306967 A1* | 12/2009 | Nicolov | G06F 17/2785 704/9 |
| 2010/0030769 A1 | 2/2010 | Cao et al. | |
| 2010/0076998 A1 | 3/2010 | Podgorny et al. | |
| 2010/0138216 A1 | 6/2010 | Tanev | |
| 2010/0191686 A1* | 7/2010 | Wang | G06F 17/30634 706/46 |
| 2010/0302281 A1* | 12/2010 | Kim | G06F 3/04883 345/661 |
| 2010/0317408 A1* | 12/2010 | Ferren | G06F 1/3265 455/566 |
| 2011/0029351 A1 | 2/2011 | Intemann et al. | |
| 2011/0066587 A1 | 3/2011 | Ferrucci et al. | |
| 2011/0087686 A1 | 4/2011 | Brewer et al. | |
| 2011/0125734 A1 | 5/2011 | Duboue et al. | |
| 2011/0262890 A1 | 10/2011 | Kanemoto | |
| 2012/0078636 A1 | 3/2012 | Ferrucci | |
| 2012/0078889 A1* | 3/2012 | Chu-Carroll | G06F 17/30654 707/723 |
| 2012/0078891 A1 | 3/2012 | Brown et al. | |
| 2012/0209847 A1 | 8/2012 | Rangan | |
| 2012/0288844 A1 | 11/2012 | Anand | |
| 2012/0301864 A1 | 11/2012 | Bagchi et al. | |
| 2013/0007055 A1 | 1/2013 | Brown et al. | |
| 2013/0017523 A1 | 1/2013 | Barborak et al. | |
| 2013/0018652 A1 | 1/2013 | Ferrucci et al. | |
| 2013/0066886 A1 | 3/2013 | Bagchi et al. | |
| 2013/0117257 A1 | 5/2013 | Meijer | |
| 2013/0297545 A1 | 11/2013 | Biemer et al. | |
| 2013/0304730 A1* | 11/2013 | Zhou | G06F 17/30864 707/723 |
| 2013/0304758 A1 | 11/2013 | Gruber | |
| 2013/0311476 A1 | 11/2013 | Biemer | |
| 2014/0040181 A1 | 2/2014 | Kuznetsov | |
| 2014/0046947 A1 | 2/2014 | Jenkins et al. | |
| 2014/0114986 A1 | 4/2014 | Biemer et al. | |
| 2014/0172883 A1 | 6/2014 | Clark et al. | |
| 2014/0181204 A1 | 6/2014 | Sharp et al. | |
| 2014/0222822 A1 | 8/2014 | Jenkins et al. | |
| 2014/0229293 A1 | 8/2014 | Huang et al. | |
| 2014/0279996 A1* | 9/2014 | Teevan | G06F 17/30864 707/706 |
| 2014/0280169 A1 | 9/2014 | Liu et al. | |
| 2014/0298199 A1 | 10/2014 | Johnson, Jr. et al. | |
| 2014/0304198 A1 | 10/2014 | Oral | |
| 2014/0316856 A1 | 10/2014 | Williams et al. | |
| 2015/0026163 A1 | 1/2015 | Haggar | |
| 2015/0120621 A1 | 4/2015 | Alkov | |
| 2015/0235131 A1 | 8/2015 | Allen et al. | |
| 2016/0034457 A1 | 2/2016 | Bradley | |
| 2016/0048514 A1 | 2/2016 | Allen | |
| 2016/0048516 A1 | 2/2016 | Guiliano | |
| 2016/0098444 A1 | 4/2016 | Berajawala et al. | |
| 2016/0098737 A1 | 4/2016 | Berajawala et al. | |
| 2016/0148093 A1 | 5/2016 | Adderly | |
| 2016/0180217 A1 | 6/2016 | Boston | |
| 2016/0232221 A1 | 8/2016 | McCloskey et al. | |
| 2016/0232222 A1 | 8/2016 | McCloskey et al. | |

OTHER PUBLICATIONS

Cao, Xin et al., "The Use of Categorization Information in Language Models for Question Retrieval", CIKM '09, Proceedings of the 18th ACM Conference on Information and Knowledge Management, Nov. 2-6, 2009, 10 pages.

High, Rob, "The Era of Cognitive Systems: An Inside Look at IBM Watson and How it Works", IBM, RedBooks, Redguides for Business Leaders, Dec. 12, 2012,16 pages, © Copyright IBM Corp. 2012, <http://ip.com/pdf/redbook/REDP495500.pdf>.

Li, Baichuan et al., "Question Routing in Community Question Answering: Putting Category in Its Place", CIKM'11, Proceedings of the 20th ACM International Conference on Information and Knowledge Management, Oct. 24-28, 2011, 4 pages.

McCord, M. C. et al., "Deep parsing in Watson", IBM J. Res. & Dev., vol. 56, No. 314, Paper 3, May/Jul. 2012, pp. 3:1-3:15, Digital Object Identifier: 10.1147/JRD.2012.2185409, © Copyright 2012 by International Business Machines Corporation.

Toh, Huey Ling, "Design of a Low-Cost Adaptive Question Answering System for Closed Domain Factoid Queries", The Florida State University College of Arts and Sciences, Dissertation approved Feb. 26, 2010, UMI 3415249, UMI ® Dissertation Publishing, Copyright 2010 by ProQuest LLC, 156 pages.

Wan et al., "Research on Pretreatment of Questions Based on Large-scale Real Questions Set", Journal of Networks, vol. 8, No. 8, Aug. 2013, pp. 1810-1816, doi: 10.4304/jnw.8.8.1810-1816.

Yuan et al., "Watson and Healthcare, How natural language processing and semantic search could revolutionize clinical decision support", IBM Corporation, developerWorks, Apr. 12, 2011, pp. 1-14, <http://www.ibm.com/developerworks/industry/library/ind-watson/>.

IBM, Appendix P, List of IBM Patents or Patent Applications Treated as Related, 2 pages, dated Jul. 11, 2017.

* cited by examiner

| QUESTION | ANSWER |
|---|---|
| 402 — What is SystemB? | SystemB is the very embodiment of this new era of cognitive systems. It represents a new class of industry-specific analytic solutions that leverages deep content analysis and evidence-based reasoning to accelerate and improve decisions, reduce operational costs and optimize outcomes. SystemB accomplishes all this based on a set of transformational technologies which leverage natural language, hypothesis generation and evidence-based learning. It combines these technologies and applies massive parallel probabilistic processing techniques to fundamentally change the way businesses look at solving problems quickly. But SystemB is more than the sum of its parts; SystemB is about bringing a unique combination of capabilities together in a way that's never been done before, resulting in a fundamental change in the way decisions are made. |
| 404 — Why should I use SystemB? | It represents a new class of industry-specific analytic solutions that leverages deep content analysis and evidence-based reasoning to accelerate and improve decisions, reduce operational costs and optimize outcomes. SystemB accomplishes all this based on a set of transformational technologies which leverage natural language, hypothesis generation and evidence-based learning. It combines these technologies and applies massive parallel probabilistic processing techniques to fundamentally change the way businesses look at solving problems quickly. |
| 406 — What are the benefits of SystemB? | It represents a new class of industry-specific analytic solutions that leverages deep content analysis and evidence-based reasoning to accelerate and improve decisions, reduce operational costs and optimize outcomes. |
| 408 — How does SystemB provide its benefits? | SystemB accomplishes all this based on a set of transformational technologies which leverage natural language, hypothesis generation and evidence-based learning. It combines these technologies and applies massive parallel probabilistic processing techniques to fundamentally change the way businesses look at solving problems quickly. |
| 410 — What is SystemB all about? | SystemB is more than the sum of its parts; SystemB is about bringing a unique combination of capabilities together in a way that's never been done before, resulting in a fundamental change in the way decisions are made. |

| QUESTION | DOCUMENT ID | DOCUMENT TITLE | ANSWER RANGE | ANSWER TEXT |
|---|---|---|---|---|
| Why should I use SystemB? | 35F72LL0CFOU | SystemB: Next Generation cognitive system : Making a market, making a difference : Vision for SystemB | 72-622 | It represents a new class of industry-specific analytic solutions that leverages deep content analysis and evidence-based reasoning to accelerate and improve decisions, reduce operational costs and optimize outcomes. SystemB accomplishes all this based on a set of transformational technologies which leverage natural language, hypothesis generation and evidence-based learning. It combines these technologies and applies massive parallel probabilistic processing techniques to fundamentally change the way businesses look at solving problems quickly. |
| What are the benefits of SystemB? | 35F72LL0CFOU | SystemB: Next generation cognitive system : Making a market, making a difference : Vision for SystemB | 72-278 | It represents a new class of industry specific analytic solutions that leverages deep content analysis and evidence-based reasoning to accelerate and improve decisions, reduce operational costs and optimize outcomes. |

FIG. 7

DETERMINING ANSWERS TO QUESTIONS USING A HIERARCHY OF QUESTION AND ANSWER PAIRS

BACKGROUND

The present invention relates generally to the field of question answering systems, and more particularly to using answer extraction to create and organize question and answer pairs.

Question answering (QA) is a known computer science discipline within the fields of information retrieval and natural language processing (NLP). Generally speaking, QA systems automatically answer questions posed by humans in natural language, typically by either querying a structured database of knowledge/information or by retrieving answers from unstructured collections of natural language documents. The process of retrieving answers from these documents (or "corpora") is sometimes referred to as "answer extraction."

SUMMARY

According to an aspect of the present invention, there is a method, computer program product and/or system that performs the following steps (not necessarily in the following order): (i) identifying a hierarchy of question and answer pairs, where a first answer paired to a first question in the hierarchy of question and answer pairs includes at least a second answer paired to a second question in the hierarchy of question and answer pairs; (ii) receiving, by a question answering system, an input question from a first user; (iii) identifying first user contextual information pertaining to the first user; and (iv) answering the input question, by the question answering system, based, at least in part, on the hierarchy of question and answer pairs and the first user contextual information.

BRIEF DESCRIPTION OF THE DRAWINGS

FIG. 4 is a table showing question and answer pairs generated by a second embodiment system according to the present invention;

DETAILED DESCRIPTION

In some question answering (QA) systems, known questions are paired with known answers prior to operation, for the purpose of training the QA systems and providing known correct answers to specific questions asked by users. Embodiments of the present invention organize question and answer pairs (QAP) into hierarchies according to common subject matter and shared answer text. Then, when users of QA systems ask questions, the QA systems select the appropriate answers from the hierarchies using contextual information pertaining to the particular users. This Detailed Description section is divided into the following sub-sections: (i) The Hardware and Software Environment; (ii) Example Embodiment; (iii) Further Comments and/or Embodiments; and (iv) Definitions.

I. The Hardware And Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
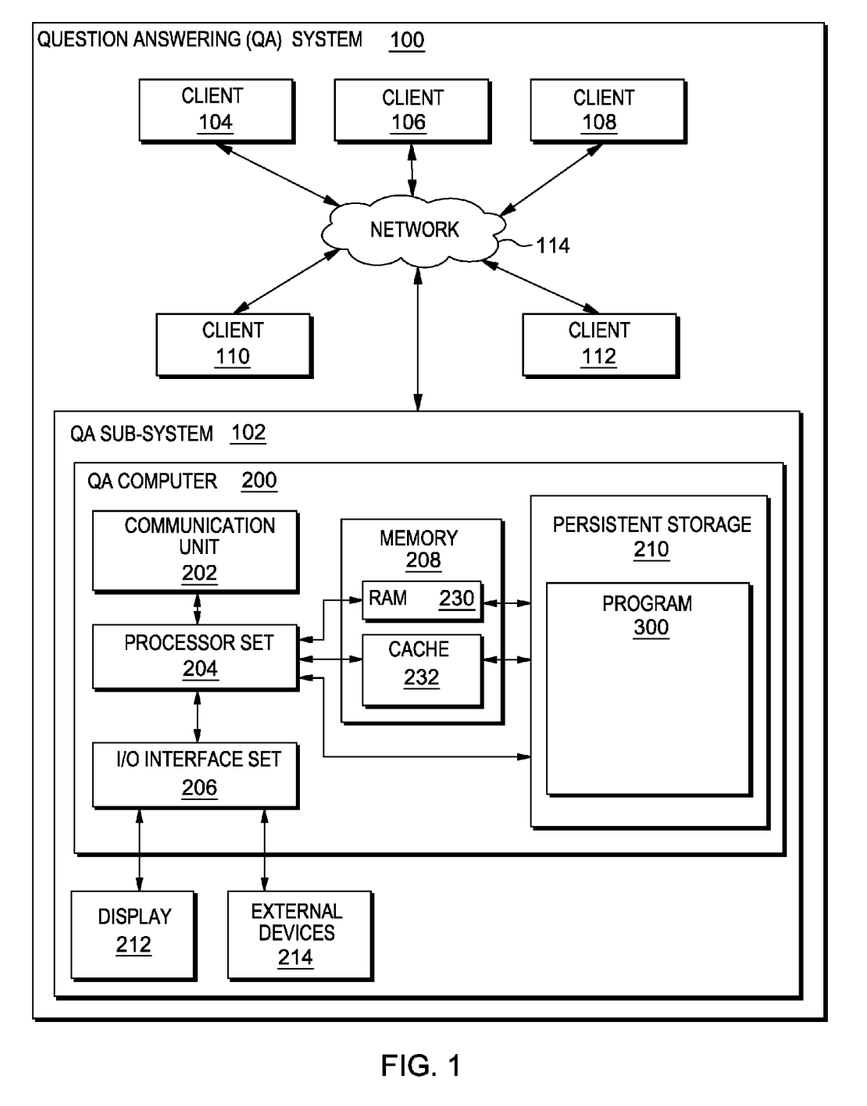
FIG. 1 is a block diagram view of a first embodiment of a system according to the present invention.

An embodiment of a possible hardware and software environment for software and/or methods according to the present invention will now be described in detail with reference to the Figures. FIG. 1 is a functional block diagram illustrating various portions of Question Answering (QA) system 100, including: QA sub-system 102; client sub-systems 104, 106, 108, 110, 112; communication network 114; QA computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
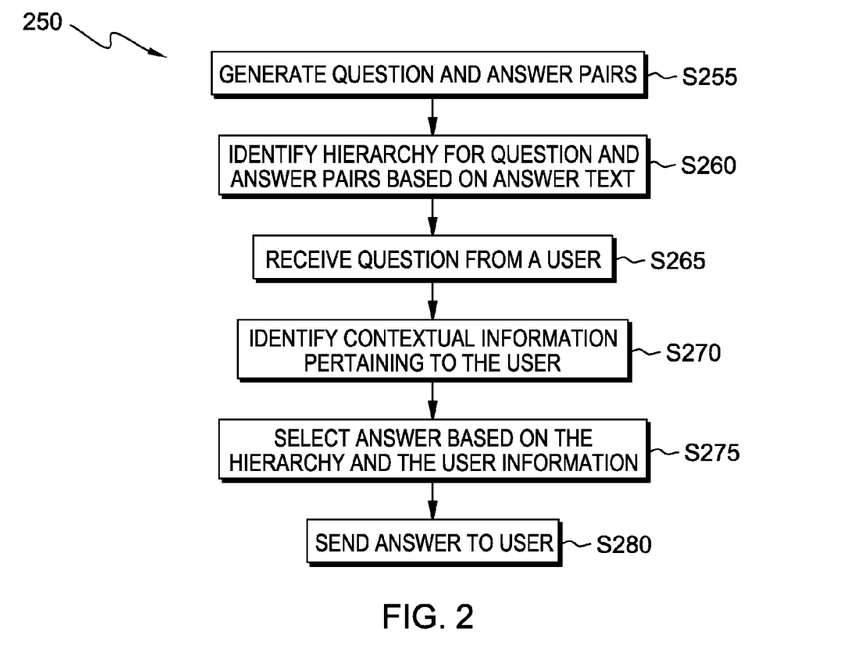
FIG. 2 is a flowchart showing a first embodiment method performed, at least in part, by the first embodiment system.
Figure 3:
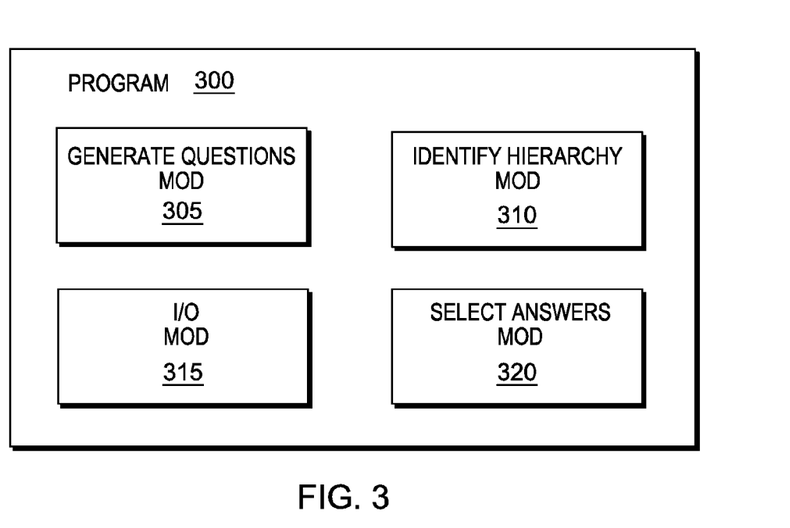
FIG. 3 is a block diagram showing a machine logic (for example, software) portion of the first embodiment system.

FIG. 2 shows flowchart 250 depicting a method (sometimes referred to as method 250) according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks). It should be noted that this example embodiment (also referred to in this sub-section as the "present embodiment," the "present example," the "present example embodiment," and the like) is used herein for example purposes, in order to help depict the scope of the present invention. As such, other embodiments (such as embodiments discussed in the Further Comments and/or Embodiments sub-section, below) may be configured in different ways or refer to other features, advantages, and/or characteristics not fully discussed in this sub-section.

Generally speaking, QA systems provide, as output, answers to natural language questions received as input. Many QA systems (including QA systems of the present invention) include predetermined sets of questions and correspondingly paired answers. These question and answer pairs (QAP) generally serve two purposes: (i) to be used as ground truths for training their respective QA systems; and (ii) to be used to answer known questions directly. When a QA system is asked a question that is similar or identical to a preexisting question in a QAP, the QA system can simply select the corresponding answer and deliver it as output. Embodiments of the present invention generate such question and answer pairs and use them to answer questions input by users.

Processing begins at step S255, where generate questions module ("mod") 305 generates question and answer pairs (or "QAP") from a set of source documents (or corpora). As stated above, QAP are questions and answers that have been paired together due to the fact that each answer is an "answer" to its correspondingly paired question. Furthermore, in many embodiments, the text of one answer (referred to herein as "answer text") may be similar, or identical, to the answer text for another answer in a different question and answer pair. Many known (or yet to be known) methods for generating QAP may be used by mod 305 in this step. For example, in many cases, generate questions mod 305 may use techniques such as information retrieval and/or natural language processing (NLP) to generate questions and answers from the set of source document(s). In some embodiments, answers include answer text that is extracted directly from the set of source documents. For example, in the present example embodiment, a single source document is used: an encyclopedia article on the sport of baseball. In this example, two simple questions are generated: (i) "What is baseball?" (referred to also as "Question A"); and (ii) "What is baseball known as?" (referred to also as "Question B"). The answers generated from these questions are extracted directly from the encyclopedia article, and their answer text includes: (i) for Question A: "Baseball is known as America's 'national pastime.' It is a game played between two teams of nine players who take turns batting and fielding"; and (ii) for Question B: "Baseball is known as America's 'national pastime.'"

As demonstrated by the present example, in many embodiments at least one answer includes within its answer text the answer text of another answer. Or, stated another way, in these embodiments, at least a first answer paired to a first question includes a second answer paired to a second question. In fact, in many embodiments, answers to questions include a plurality of other answers within their answer text. For the sake of simplicity, and to help in explaining this feature, an answer with answer text that is fully included within the answer text of a second answer will be sometimes referred to as a "sub-answer" of the second answer, where the second answer will sometimes be referred to as the "parent answer." Similarly, a question paired to a sub-answer of a parent answer will sometimes be referred to as a "sub-question" of the parent answer's paired question, where the parent answer's paired question will sometimes be referred to as the "parent question." For additional discussion of sub-questions (also referred to as "child" questions), sub-answers (also referred to as "child" answers"), parent questions (also referred to as "root" questions), and parent answers (also referred to as "root" answers), as well as their importance in creating QAP hierarchies according to the present invention, see: (i) the discussion of step S260 (see FIG. 2), below; and (ii) the Further Comments and/or Embodiments sub-section of this Detailed Description, also below.

Many known (or yet to be known) source documents (or corpora) may be used in generating question and answer pairs according to the present invention. For example, in some embodiments (including the present example embodiment), the source documents include one or more articles pertaining to particular subject matter (or a particular domain). However, this is not meant to be limiting. As used herein, a source document may be any piece of information that is able to serve as the basis for creating a QAP according to the present invention. In one embodiment, the set of source documents includes a single sentence of text-based content. In another embodiment, the set of source documents includes a wide variety of documents (from short articles to large, multi-volume works) provided for the purpose of training a QA system for a particular domain. In yet another embodiment, the set of source documents includes the entire collection of structured and unstructured data available via the World Wide Web.

Processing proceeds to step S260, where identify hierarchy mod 310 identifies a hierarchy for the question and answer pairs based, at least in part, on the answer text for each of the respective question and answer pairs. As used herein, a hierarchy is any organization of QAPs in which QAPs are arranged, ordered, ranked, categorized, organized, and/or compared to each other. In certain embodiments of the present invention, including, for example, the present example embodiment, the hierarchy is based on relationships between the corresponding answer text for answers in the generated QAP. More specifically, in many of these embodiments, sub-questions/sub-answers are positioned nearby their parent questions/parent answers in the hierarchy (such as, for example, in the same "tree" of the hierarchy). Further, in these embodiments, the sub-questions/sub-answers are typically placed "below" their parent questions/parent answers, indicating a child/parent relationship. In the present example embodiment, Question A and Question B are placed next to each other in the identified hierarchy, due to the fact that they share common answer text. Furthermore, because the answer to Question B is a sub-answer of the answer to Question A, Question A is ranked above (that is, higher than) Question B in the identified hierarchy. In other embodiments, however, a much more complex hierarchy may be identified. For example, some embodiments include hierarchies that include multiple levels, where parent questions/answers are ranked the highest, followed by sub-questions/answers, followed by sub-questions/answers of the sub-questions/answer, and so on. Furthermore, in some embodiments, each set of question and answer pairs pertaining to the same shared answer text is placed in its own separate hierarchy.

Processing proceeds to step S265, where I/O mod 315 (see FIG. 3) receives a question from a user. The question—which is provided by the user as input into QA system 100 for the purpose of receiving an answer as output—may be received from the user in any of a wide variety of ways including, for example, using a keyboard (physical or virtual) or a microphone of external devics 214 (see FIG. 1). Furthermore, in some embodiments, the user may submit the question to mod 315 via one of client sub-systems 104, 106, 108, 110, and/or 112. In the present example embodiment, the user asks the following question using the microphone on her smartphone: "what is baseball?"

Processing proceeds to step S270, where I/O mod 315 identifies contextual information pertaining to the user. The contextual information can be any information relating to the user that may be helpful in interpreting and/or contextualizing the user's question. For example, in some embodiments, the contextual information includes the user's location, the user's role (particularly, when QA system 100 has a list of predefined roles), the device the user is using to ask the question, and/or the user's emotional state (such as the user's mood and/or attitude). In the present example embodiment, the contextual information includes the fact that the user is asking the question on a smartphone. Other example of contextual information include, but are not limited to: the user's age, the user's gender, the user's ethnicity, the user's native language, the user's education, the date, and/or the time. Furthermore, the contextual information may be obtained using a wide variety of known (or yet to be known) methods. In some embodiments, the contextual information is obtained, at least in part, from a database with known information about the user and/or the user's relation to QA system 100. In other embodiments, the contextual information is included along with the received question asked by the user. In still other embodiments, the contextual information may be determined by analyzing the user's question, including, for example, by analyzing the user's voice when the question is asked using a microphone. For additional examples of contextual information and the ways that contextual information can be retrieved, see the Further Comments and/or Embodiments sub-section of this Detailed Description.

Processing proceeds to step S275, where select answers mod 320 selects an answer based, at least in part, on the QAP hierarchy and the contextual information pertaining to the user. In many embodiments, in this step, mod 320 selects the question and answer pair from the hierarchy that most closely matches the user's question and contextual information. In some embodiments, such as the present example embodiment, there is a direct word-for-word match between the user's question and a question in the QAP hierarchy. In some situations where there is a direct match, a QA system might simply provide the answer paired to the matched question. However, embodiments of the present invention also consider the user's contextual information. In the present embodiment, for example, the fact that the user is using a smartphone is important, as smartphone users have limited screen space to view answers to questions (and/or limited attention spans for listening to long answers). As such, although the user's question is identical to Question A, mod 320 traverses the QAP hierarchy to determine if any questions below Question A in the hierarchy have answer text that might sufficiently answer the user's question in fewer words than Question A. As a result, mod 320 selects the answer to Question B: "Baseball is known as America's national pastime."

The selection of an answer in step S275 may take place in a wide variety of ways. In many embodiments, the selection process benefits from the fact that the QAP hierarchy has (in step S260) identified question and answer pairs with similar and/or related questions and answers. For example, in some embodiments (such as the present example embodiment), the selection of an answer involves selecting answer text that is similar (based on the hierarchy) to answer text paired to the original question, but that is more suitable based on the user's contextual information. The same applies for questions. For example, in some embodiments, an answer is selected by looking at questions that are similar (based on the hierarchy) to the originally asked question, but are more suitable based on the user's contextual information. Additionally, in some cases, mod 320 may use the text of similar questions in the hierarchy to expand the search for an answer to questions not located in the same "tree" in the hierarchy (due to, for example, the questions' answers coming from different source documents). For example, referring to the present example embodiment, Question A and Question B were placed nearby each other in the hierarchy due to the fact that they share some identical answer text originating from the same source document. In some situations (for example, where the asked question is slightly different or where there is more contextual information to consider), mod 320, in selecting an answer, may identify Question B as a question that is similar to Question A, and then search for other questions similar to Question B that do not share the same answer text. If one of those other questions provides a suitable answer to the user's question, mod 320 may select that answer instead of the answer to Question A or Question B.

Processing proceeds to step S280, where I/O mod 315 sends the answer to the user. The answer may be sent to the user in a wide variety of ways, including, for example, via display 212, a speaker of external device set 214, or any one or more of client sub-systems 104, 106, 108, 110, 112. In the present example embodiment, mod 315 communicates the answer (that is, the selected answer to Question B) to the user via the speakers on the user's smartphone. In some cases, mod 320 may also provide the user with the opportunity to receive additional information pertaining to the user's question (such as, for example, the answer to Question A). Additional ways of communicating answers to the user will be discussed in the following sub-section.

III. Further Comments And/Or Embodiments

Some embodiments of the present invention recognize the following facts, potential problems and/or potential areas for improvement with respect to the current state of the art: (i) many existing question answering (QA) systems map multiple questions to the same answer; and (ii) many answers in QA systems can be quite long, even though the portion of an answer pertaining to a particular question may be much shorter.

Some embodiments of the present invention may include one, or more, of the following features, characteristics and/or advantages: (i) generating a hierarchy of questions to be able to provide answers, even when a question does not necessarily map to existing questions in a ground truth; and (ii) narrowing the scope of a given question in order to disambiguate it.

Some embodiments of the present invention map a top-level question (or questions) to a piece of a source document (where sometimes source documents are further segmented into smaller logical sections). Whenever a question with an answer that is a subset of the answer of a top-level question is added, the question becomes a child of the top-level question. This provides a hierarchy of questions and associated answers, where child questions can be used as context to understand the content of the answer text for parent questions. This allows embodiments of the present invention to provide known good answers to questions that might not otherwise be mapped, and to narrow the scope of questions to the topics of their sub-questions.

The following paragraphs will discuss a second example embodiment according to the present invention (also referred to in this sub-section as the "present embodiment," the "second embodiment," the "second example embodiment," and the like). In this embodiment, the following example text is selected from a set of source documents as potential answer text in a question answering (QA) system:
Example Text SystemB is the very embodiment of this new era of cognitive systems. It represents a new class of industry-specific analytic solutions that leverages deep content analysis and evidence-based reasoning to accelerate and improve decisions, reduce operational costs and optimize outcomes. SystemB accomplishes all this based on a set of transformational technologies which leverage natural language, hypothesis generation and evidence-based learning. It combines these technologies and applies massive parallel probabilistic processing techniques to fundamentally change the way businesses look at solving problems quickly. But SystemB is more than the sum of its parts; SystemB is about bringing a unique combination of capabilities together in a way that's never been done before, resulting in a fundamental change in the way decisions are made.

Table 400 (see FIG. 4) depicts question and answer pairs (QAP) generated by the QA system of the present embodiment, based on the provided example text. More specifically, row 402 depicts the question, "What is SystemB?" and provides the entire example text as the answer (where the question and answer for row 402 may be referenced herein as question 402 and answer 402, respectively). Furthermore, rows 404, 406, 408, and 410 (see FIG. 4) depict the following additional questions along with their paired answers, respectively, where the answers are subsets of the provided example text (and answer 402): (i) question 404, "Why should I use SystemB?"; (ii) question 406, "What are the benefits of SystemB?"; (iii) question 408, "How does SystemB provide its benefits?"; and (iv) question 410, "What is SystemB all about?".

Once questions have been paired (or "mapped") to subsets of the provided example text, the QA system generates a hierarchy of questions. This hierarchy is depicted in diagram 500 (see FIG. 5). As shown in diagram 500, question 402 is at the top of the hierarchy, as its answer text includes the entire provided example text. Further, the answer text for questions 404 and 410 are subsets of the answer text for question 402, and the answer text for questions 406 and 408 are subsets of the answer text for question 404.

Figure 5:
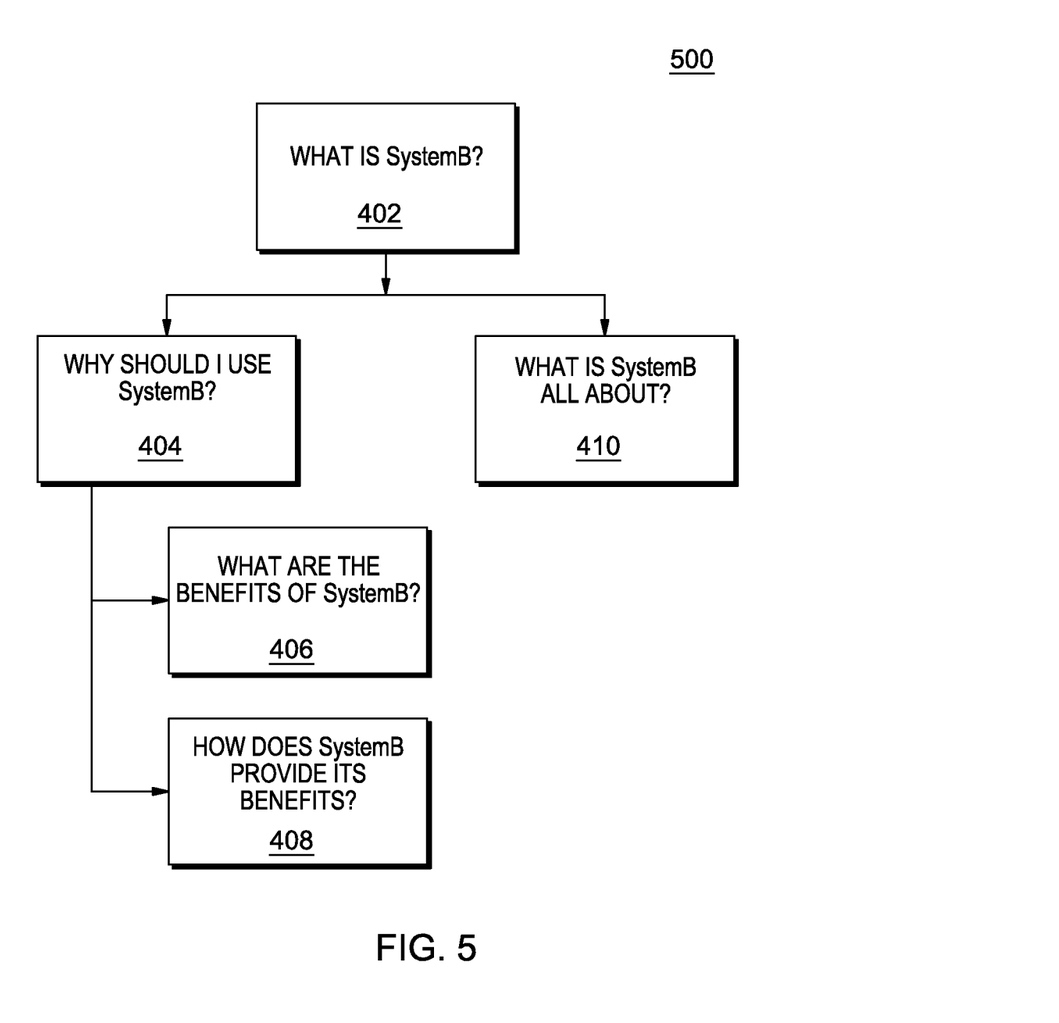
FIG. 5 is a diagram showing a question and answer hierarchy according to the second embodiment system.

According to the hierarchy depicted in diagram 500 (and based on the similarity of answers depicted by the hierarchy), the answer to question 402, "What is SystemB?" returns information related to: (i) why one should use SystemB (see question 404); (ii) what SystemB is about (see question 410); (iii) and the benefits of SystemB (see questions 406 and 408). This information provides additional context for what it means to answer question 402, showing that the answer to question 402 includes what SystemB is, why someone should use it, and what its benefits are.

In some embodiments of the present invention, question answering (QA) systems train models to understand the types of information needed to answer questions, in order to generate answers from more than one piece of source documents (or corpora). For example, when a user of a QA system asks a question, the QA system could process the question's known sub-questions to get answers from whichever source documents provide the best answers to each question. The QA system could then concatenate those answers to provide a single answer to the question.

One benefit to the question hierarchies of the present invention is that they help to answer previously unknown questions. For example, if a user asks the question, "How can SystemB benefit me?", a QA system might first look to see if it has a confident answer to the question in its QA pipeline. However, if the QA system does not find any confident answers, the QA system can look at similar known questions, such as question 406 ("What are the benefits of SystemB?") and question 408 ("How does SystemB provide its benefits?"). Although neither of the answers to these questions would directly answer the question of how SystemB would benefit the user, the QA system would at least be able to identify that the parent question to questions 406 and 408—question 404 ("Why should I use SystemB?")—would provide information about benefits. As such, the QA system could return the answer to question 404.

In some embodiments of the present invention, question hierarchies are used to further refine a user's questions to provide an answer more tailored to the user's actual needs. For example, in the second example embodiment, a user asks: "What is SystemB?" Although there is already a known good answer to this question, it may be beneficial to ask the user to be more specific, in order to provide a shorter, more focused answer. The following is a sample interaction between the user and a QA system according to this example:
Sample Interaction
USER: "What is SystemB?"
QA SYSTEM: "Did you mean: (a) Why should I use SystemB?, (b) What is SystemB all about?, or (c) What are the benefits of SystemB?
USER: "(c)"
QA SYSTEM: "It represents a new class of industry-specific analytic solutions that leverages deep content analysis and evidence-based reasoning to accelerate and improve decisions, reduce operational costs and optimize outcomes."

The calculation and/or display of questions according to this example could be handled in a variety of different ways. Some possible factors that may be considered include, but are not limited to: (i) the context of the conversation (or "contextual information" about the user); (ii) how often certain questions are asked of the system; and/or (iii) user feedback for various questions and answers.

Some embodiments of the present invention allow for providing varying lengths of answers to questions. That is, in some embodiments, known questions (ground truths) are sub-divided into groups based on answer length. In these embodiments, each sub-divided group of questions (and their corresponding answers) could be used to train its own set of machine learning models. Depending on context, embodiments of the present invention could then select the best model(s) to use to answer user questions based on a desired answer length. Answer lengths could be grouped in any of a wide variety of ways. For example, in one embodiment, answers are grouped based on how many characters they contain, where answers with between zero and 100 characters are grouped together, answers with between 101 and 500 characters are grouped together, answers with between 501 and 1000 characters are grouped together, and answers with more than 1000 characters are grouped together. In another embodiment, answers are grouped based on their depth in a question hierarchy (as, generally speaking, answers gradually get shorter as they proceed further down the hierarchy).

In some embodiments of the present invention, the determination of which answer to provide is based, at least in part, on contextual information, such as the device being used to ask the question. For example, when a user asks a question using a mobile phone, a QA system would likely want to provide the shortest answer possible due to the reduced screen size. In this example, the score for candidate answers returned from a short answers model would be increased. Additionally, the QA system may choose not to provide the user with a list of sub-questions to choose from, due again to the limited screen size. However, in other examples, the QA system may decide to provide longer answers. For example, if the user of a system is a customer service agent using a web browser, the user is more likely to want more information and desire longer answers. In this example, the QA system may give a higher weight to candidate answers returned from a long answers model. In many embodiments, answer length requirements/preferences (that is, contextual information) could easily be set on a user-by-user basis.

Figure 6:
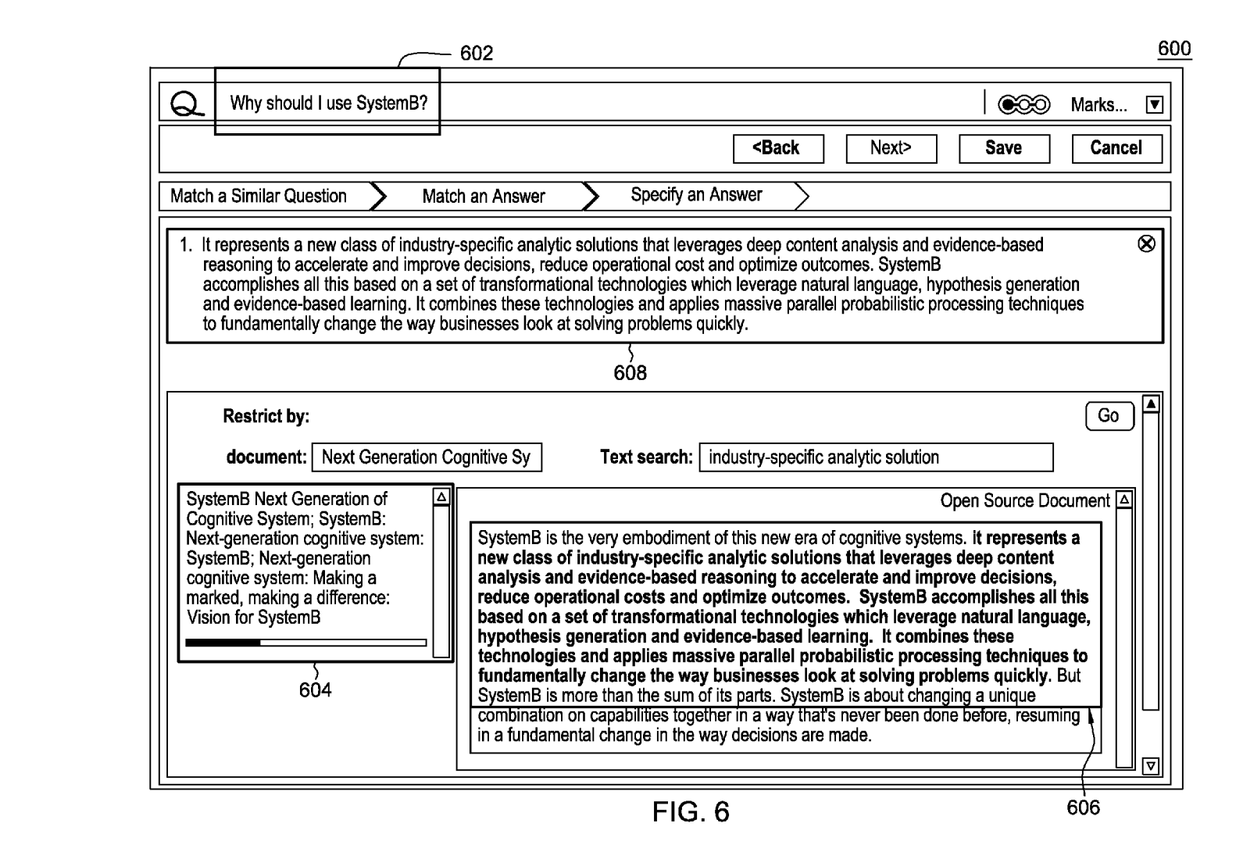
FIG. 6 is a screenshot view generated by the second embodiment system.

In some embodiments of the present invention, question and answer pairs are generated using a ground truth tool. In these embodiments, the ground truth tool allows an administrative user to enter a question, find potential answers from source documents, and map those answers to the question. Screenshot 600 (see FIG. 6) depicts an example of a ground truth tool according to the second example embodiment. As shown in FIG. 6, the administrative user begins by asking a question, which, in this case, is question 602 ("Why should I use SystemB?") which happens to be identical to question 404 (discussed above in relation to FIGS. 4 and 5). In response to question 602, the ground truth tool searches source documents (also referred to as "ingested documents" or "ingested corpora") for possible answer text. As shown in screenshot 600, the administrative user selects answer portion 606 from source document 604, resulting in answer 608 to question 602.

Figure 7:
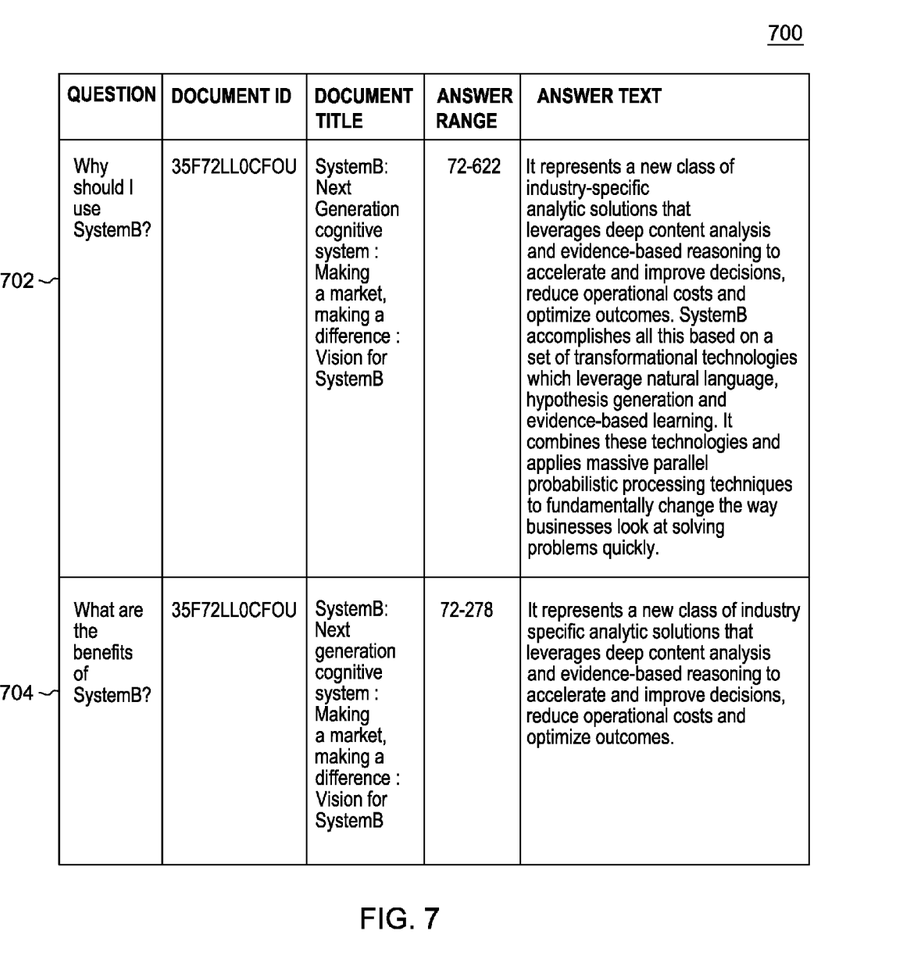
FIG. 7 is a table showing information that is helpful in understanding the second embodiment system.

Table 700 (see FIG. 7) depicts information helpful in understanding the second example embodiment. More specifically, row 702 shows information pertaining to the question and answer pair generated by the ground truth tool as shown in screenshot 600 (see FIG. 6), and row 704 shows information pertaining to an additionally generated question and answer pair. As shown in FIG. 7, table 700 includes the following information for each question and answer pair: (i) the question; (ii) the ID of the document from which the question's answer was generated ("the document"); (iii) the document's title; (iv) the answer range (that is, the location and length of the answer within the document); and (v) the answer text. As demonstrated by this table, answers with overlapping answer ranges in the same document can quickly be identified as parents/children. Specifically, because the answer for the question in row 704 is a subset of the answer for the question in row 702, the QA system in this embodiment determines that the question in row 704 is a child of the question in row 702 in its question hierarchy.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Natural Language: any language used by human beings to communicate with each other.

Question Answering System: any computer system capable of answering a question posed in natural language.

What is claimed is:

1. A method comprising:
generating a plurality of question and answer pairs, where the plurality of question and answer pairs includes at least a first answer paired to a first question and a second answer paired to a second question, where the second answer paired to the second question is a subset of the first answer paired to the first question;
identifying a hierarchy of question and answer pairs, where the first answer paired to the first question is at a root node in the hierarchy of question and answer pairs, and where the second answer paired to the second question is at a node below the root node in the hierarchy of question and answer pairs based, at least in part, on the second answer being a subset of the first answer;
receiving, by a question answering system, an input question from a first user, where the input question matches the first question;
identifying first user contextual information pertaining to the first user, where the first user contextual information indicates a desired answer length based on a screen size of a device used by the first user to submit the input question, the desired answer length being shorter than a length of the first answer; and
answering the input question with the second answer, by the question answering system, based, at least in part, on the hierarchy of question and answer pairs and the first user contextual information, wherein answering the input question with the second answer includes sending the second answer to the device used by the user to submit the input question.

2. The method of claim 1, wherein:
the first user contextual information indicating the desired answer length is based, at least in part, on the first user using a mobile device to input the question.

3. The method of claim 1, wherein the first user contextual information includes at least one of the following: the user's location, the date that the first user contextual information was identified, and/or the time that the first user contextual information was identified.

4. The method of claim 1, wherein the answering of the input question is further based, at least in part, on a set of ground truth question and answer pairs.

5. The method of claim 1, wherein:
each node below the root node in the hierarchy of question and answer pairs corresponds to an answer that is a subset of the first answer.

6. A computer program product comprising a computer readable storage medium having stored thereon:
program instructions programmed to generate a plurality of question and answer pairs, where the plurality of question and answer pairs includes at least a first answer paired to a first question and a second answer paired to a second question, where the second answer paired to the second question is a subset of the first answer paired to the first question;
program instructions programmed to identify a hierarchy of question and answer pairs, where the first answer paired to the first question is at a root node in the hierarchy of question and answer pairs, and where the second answer paired to the second question is at a node below the root node in the hierarchy of question and answer pairs based, at least in part, on the second answer being a subset of the first answer;
program instructions programmed to receive, by a question answering system, an input question from a first user, where the input question matches the first question;
program instructions programmed to identify first user contextual information pertaining to the first user, where the first user contextual information indicates a desired answer length based on a screen size of a device used by the first user to submit the input question, the desired answer length being shorter than a length of the first answer; and
program instructions programmed to answer the input question with the second answer, by the question answering system, based, at least in part, on the hierarchy of question and answer pairs and the first user contextual information, wherein answering the input question with the second answer includes sending the second answer to the device used by the user to submit the input question.

7. The computer program product of claim 6, wherein:
the first user contextual information indicating the desired answer length is based, at least in part, on the first user using a mobile device to input the question.

8. The computer program product of claim 6, wherein the first user contextual information includes at least one of the following: the user's location, the date that the first user contextual information was identified, and/or the time that the first user contextual information was identified.

9. The computer program product of claim 6, wherein the answering of the input question is further based, at least in part, on a set of ground truth question and answer pairs.

10. The computer program product of claim 6, wherein:
each node below the root node in the hierarchy of question and answer pairs corresponds to an answer that is a subset of the first answer.

11. A computer system comprising:
a processor(s) set; and
a computer readable storage medium;
wherein:
the processor set is structured, located, connected and/or programmed to run program instructions stored on the computer readable storage medium; and
the program instructions include:
  program instructions programmed to generate a plurality of question and answer pairs, where the plurality of question and answer pairs includes at least a first answer paired to a first question and a second answer paired to a second question, where the second answer paired to the second question is a subset of the first answer paired to the first question;
  program instructions programmed to identify a hierarchy of question and answer pairs, where the first answer paired to the first question is at a root node in the hierarchy of question and answer pairs, and where the second answer paired to the second question is at a node below the root node in the hierarchy of question and answer pairs based, at least in part, on the second answer being a subset of the first answer;
  program instructions programmed to receive, by a question answering system, an input question from a first user, where the input question matches the first question;
  program instructions programmed to identify first user contextual information pertaining to the first user, where the first user contextual information indicates a desired answer length based on a screen size of a device used by the first user to submit the input question, the desired answer length being shorter than a length of the first answer; and
  program instructions programmed to answer the input question with the second answer, by the question answering system, based, at least in part, on the hierarchy of question and answer pairs and the first user contextual information, wherein answering the input question with the second answer includes sending the second answer to the device used by the user to submit the input question.

12. The computer system of claim 11, wherein:
the first user contextual information indicating the desired answer length is based, at least in part, on the first user using a mobile device to input the question.

13. The computer system of claim 11, wherein the first user contextual information includes at least one of the following: the user's location, the date that the first user contextual information was identified, and/or the time that the first user contextual information was identified.

14. The computer system of claim 11, wherein the answering of the input question is further based, at least in part, on a set of ground truth question and answer pairs.

15. The computer system of claim 11, wherein each node below the root node in the hierarchy of question and answer pairs corresponds to an answer that is a subset of the first answer.

* * * * *